Dec. 29, 1942. A. L. DILLER 2,306,937
RUBBER ARTICLE AND METHOD OF MAKING THE SAME
Filed Aug. 2, 1940
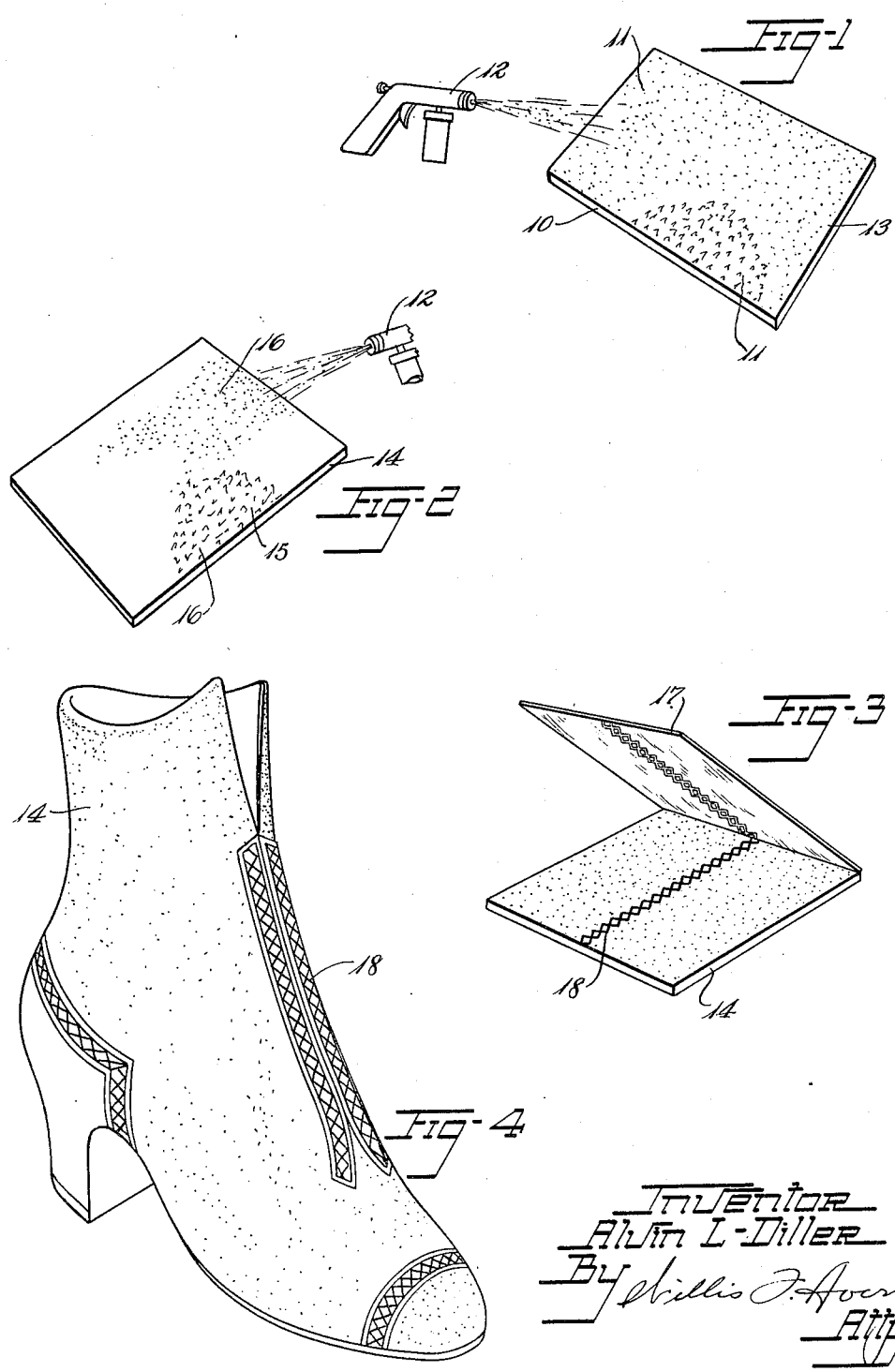

Patented Dec. 29, 1942

2,306,937

UNITED STATES PATENT OFFICE 2,306,937

RUBBER ARTICLE AND METHOD OF MAKING THE SAME

Alvin L. Diller, Belmont, Mass., assignor to The B. F. Goodrich Company, New York, N. Y., a corporation of New York Application August 2, 1940, Serial No. 349,755

4 Claims. (Cl. 18—58)

This invention relates to rubber articles having unique surface characteristics and to methods of making such articles. The invention is especially useful in the manufacture of decorative rubber footwear but may be used in making numerous other articles as hereinafter indicated.

The unique surface characteristics produced in the present invention are obtained by providing a surface presenting a multitude of depressions and a multitude of projections of general similar configurations. The invention also contemplates the combination of such unique surface with decorative strips presenting well defined geometric designs. The novel aspects of the surfaces and the methods of producing them will be described in considerable detail with reference to a preferred embodiment of the invention as illustrated in the accompanying drawing.

Of the drawing

Fig. 1 is a more or less diagrammatic perspective view illustrating an initial step in the production of the unique surface of the present invention;

Fig. 2 is a similar view showing a subsequent step in the process;

Fig. 3 is a fragmentary perspective view illustrating a preferred mode of providing a design strip on the rough surface of the material of Fig. 2;

Fig. 4 is a perspective view of an article of footwear produced in accordance with the present invention and embodying the novel surface features of the invention.

In a preferred embodiment of the invention as illustrated in the drawing, I first provide a base member 10 which preferably comprises a hard rubber composition in sheet form. I then provide on one face of the base member 10 a multitude of small projecting masses of latex rubber 11, 11 scattered indiscriminately but uniformly over the surface of the base member. The projecting masses 11 may be applied by spraying latex with a conventional spray gun 12, the application of the sprayed latex particles being controlled so that a rough granular surface presenting upstanding projections is formed. If desired, the base layer 10 may be pre-treated with a coagulant for latex, or such a coagulant may be sprayed simultaneously with the latex to assist in the formation of the rough granular surface. Such procedures are well known in the art and are described in U. S. Patents Nos. 2,056,406 and 2,120,406. The rough surface of the base layer 10 is then treated with dry powdered sulfur as by spraying the sulfur on the surface and the assembly is then vulcanized to the hard rubber stage by heating in the usual manner. Such treatment of the rough surface with dry powdered sulfur seems to produce a hardened surface especially adaptable to reproduction and easy stripping of reproduced sheets therefrom as hereinafter more fully described. The latex which is sprayed to produce the rough surface, of course, may contain vulcanizing agents sufficient to vulcanize the rubber to the hard rubber stage without such application of sulfur.

It will be appreciated that the foregoing operations result in the production of an original matrix member generally designated by the numeral 13 which exhibits a rough surface presenting a multitude of relatively small projections.

As the next step in the process, I produce a negative reproduction 14 of the original matrix member 13. The negative reproduction is preferably formed by immersing the matrix member 13 in a bath of liquid latex composition and coagulating latex thereon, or otherwise coating the matrix with latex, and thereafter drying the latex rubber on the matrix to produce a rubber deposit of a suitable thickness constituting the reproduction 14. After the reproduction 14 is dried, it is stripped from the original matrix member 13 to expose the configured face of the reproduction 14 which, it will be understood, presents a multitude of depressions 15 corresponding to the projections 11 of the original matrix member. I then apply to the configured face of the reproduction 14 a multitude of projecting masses 16 of rubber similar to the projecting masses 11 applied to the original matrix member. The projecting masses 16 may be applied by spraying latex in the manner hereinabove described in connection with the preparation of the original matrix member 13, and the masses 16 should be distributed more or less uniformly and indiscriminately over the configured face of the reproduction 14.

The surface so produced presents, in combination, a multitude of relatively small depressions and relatively small projections of similar configurations and this combination provides a unique surface having unusually valuable appearance characteristics and also valuable frictional or non-slip characteristics.

The rough-surfaced material so prepared may be used directly in the manufacture of a rubber article or, if desired, it may be utilized in turn as an original matrix and reproduced in finished articles, for example, as described in U. S. Patent No. 1,983,667.

When employed in an article of footwear as illustrated in Fig. 4, the rough surface produced as hereinabove described is valuable because of its similarity in appearance to suede leather. The principles of the invention also are valuable in producing articles such as household gloves in which non-slip surface characteristics are of value.

It has further been found that unusually pleasing design effects may be secured by combining material having a rough surface produced as hereinabove described with strip elements presenting definite geometric designs. The rough surfaced material, of course, is devoid of definite design characteristics and the contrast between such material and a strip presenting a well defined design results in a very pleasing appearance. For example, I may electro-deposit latex rubber upon a mold member 17 such as a zinc plate having a predetermined design etched therein to produce a strip element 18 comprising a latex rubber deposit having a definite geometric design configuration corresponding to the mold design. Such procedure is described in U. S. Patent No. 1,989,676. The strip element 18 preferably is adhered to a rough surface portion of the reproduction 14, as illustrated in Fig. 3, as by simply superposing the mold member 17 with the deposit 18 thereon over the reproduction 14 and pressing the two rubber surfaces into adhesive engagement. The mold member 17 may then be removed to leave the strip 18 in place on the reproduction 14 as shown in Fig. 3. Any suitable rubber adhesive may be applied to the element 18, or to the reproduction 14, or to both, to secure better adhesion. The resulting sheet material formed by combining the strip 18 and the sheet element 14 may be used in any of the manners hereinabove described in connection with the reproduction 14. That is, it may be utilized directly in the manufacture of an article of footwear, in which case the product may have an appearance such as that illustrated in Fig. 4. In this case both the reproduction 14 and the strip element 18 will be formed of a soft rubber composition and will be vulcanized to the soft rubber stage after being built into the shoe. Alternatively the material may be vulcanized to the hard rubber stage and utilized as an original material for making further reproductions as described in U. S. Patent No. 1,983,667, for example.

As may be seen from Fig. 4, the combination of the definite geometric design of the strip element 18 with the peculiar rough surface appearance of the reproduction 14 presents an unusually pleasing appearance.

The term "latex" has been used in a generic sense to include not only the natural latex of the Hevea tree but also all other naturally occurring or artificially prepared analogous aqueous dispersions of natural and synthetic rubbers. Such dispersions may be concentrated, diluted, thickened, thinned, compounded, vulcanized, or otherwise prepared and conditioned for use in accordance with well known practice.

Numerous modifications and variations in the procedure and products hereinabove described may be effected without departing from the spirit and scope of the invention as defined by the appended claims.

I claim:

1. The method of making an article having a rough surface which comprises producing an original member having a surface presenting a multitude of projections, forming a negative reproduction thereof having a configured surface presenting a multitude of depressions corresponding to the projections in the original, and producing on the configured surface of the negative reproduction surface projections similar to the original projections, whereby the combination of similarly configured projections and depressions provides a unique surface.

2. The method of making an article having a rough surface which comprises producing, by a process including the step of spraying latex on a base, an original member having a surface presenting a multitude of projections; forming a negative reproduction thereof having a configured surface presenting a multitude of depressions corresponding to the projections in the original; and producing on the configured surface of the negative reproduction, by a process including the step of spraying latex thereon, surface projections similar to the original projections; whereby the combination of similarly configured projections and depressions provides a unique surface.

3. An article of manufacture including a rough surface resembling suede leather in appearance, said surface being composed essentially of rubber material and presenting a multitude of depressions and a multitude of projections of generally similar configurations, which article has been produced by the method of claim 1.

4. An article of manufacture including a rough surface resembling suede leather in appearance, said surface being composed essentially of rubber material and presenting a multitude of depressions and a multitude of projections of generally similar configurations, which article has been produced by the method of claim 2.

ALVIN L. DILLER.